Patented Jan. 19, 1954

2,666,784

UNITED STATES PATENT OFFICE 2,666,784

NONHYGROSCOPIC CHOLINE SALTS

Heinrich Hopff and Hermann Spaenig, Ludwigshafen (Rhine), Germany, assignors to Badische Anilin- & Soda-Fabrik Aktiengesellschaft, Ludwigshafen (Rhine), Germany No Drawing. Application January 31, 1952,
Serial No. 269,342

Claims priority, application Germany
February 1, 1951

2 Claims. (Cl. 260—501)

This invention relates to non-hygroscopic choline-calcium double salts of polybasic acids and choline-magnesium double salts of polybasic acids and to the process for producing the said salts.

In the therapeutic use of choline considerable difficulties are encountered by reason of the hygroscopicity of the choline salts employed because the tablets prepared therefrom tend to deliquesce and discolor in the air.

We have now found that this drawback can be obviated by treating acid salts from choline and polybasic acids with calcium or magnesium compounds and converting them into the corresponding calcium or magnesium double salts.

Suitable choline salts are for example mono- or di-choline citrate, mono- or di-choline phosphate, monocholine tartrate, monocholine maleinate, the acid choline salts of butene tetracarboxylic acid and other salts of choline with polybasic acids which still contain hydrogen atoms replaceable by metal.

As examples of suitable calcium of magnesium compounds there may be mentioned the oxides, hydroxides, carbonates, bicarbonates and chlorides of these metals.

The preparation of the calcium or magnesium double salts may be carried out by treating solutions of the acid choline salts in water or in lower alcohols, such as methanol or ethanol, with about the equimolecular amounts of calcium hydroxide or calcium carbonate or of the corresponding magnesium compounds. The double salts formed thus separate either immediately or after concentration of the solution as pale powders. Organic solvents may also be added to the reaction solution in order to precipitate the double salts.

The procedure may also be that the acid choline salts are first converted into their sodium salts and the latter then treated with the calcium or magnesium compounds. This manner of working is especially advantageous in the reaction of calcium chloride with choline salts.

The following example will further illustrate this invention but the invention is not restricted to this example. The parts are by weight.

Example 295 parts of monocholine citrate are dissolved in 400 parts of water and 74 parts of calcium hydroxide are added while stirring. The reaction mixture warms up to about 50° C., the calcium hydroxide passing completely into solution. After evaporation of the solution under reduced pressure, the calcium salt of choline citrate is obtained as a white powder (330 parts).

What we claim is:

1. A calcium salt of monocholine citrate of the formula

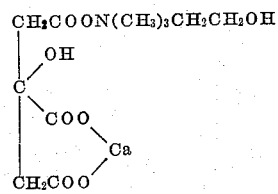

2. A double salt of monocholine citrate of the formula

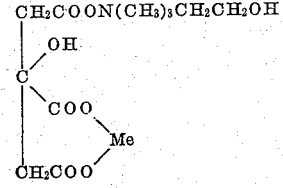

wherein Me is an alkaline earth metal with an atomic weight from 24.3 to 40.1.

HEINRICH HOPFF.
HERMANN SPAENIG.

References Cited in the file of this patent

FOREIGN PATENTS

| Number | Country | Date |
|---|---|---|
| 562,267 | Great Britain | June 26, 1944 |

OTHER REFERENCES

Seaman et al., Chem. Abstracts, vol. 43, p. 4184 (1949).

Brigando et al., Compt. Rendus (Fr. Acad.) vol. 228, pp. 1035-36 (1949).